United States Patent
Isshiki

(10) Patent No.: US 8,804,185 B2
(45) Date of Patent: Aug. 12, 2014

(54) IMAGE PROCESSING DEVICE AND IMAGE PROCESSING METHOD FOR REDUCING IMAGE DEGRADATION

(75) Inventor: Naohiro Isshiki, Kawasaki (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 180 days.

(21) Appl. No.: 13/440,279

(22) Filed: Apr. 5, 2012

(65) Prior Publication Data

US 2012/0257253 A1    Oct. 11, 2012

(30) Foreign Application Priority Data

Apr. 11, 2011    (JP) .................................. 2011-087221

(51) Int. Cl.
*G06K 15/02*    (2006.01)
(52) U.S. Cl.
CPC ........ *G06K 15/1849* (2013.01); *G06K 15/1889* (2013.01); *G06K 15/1865* (2013.01); *G06K 15/1852* (2013.01); *G06K 15/1892* (2013.01)
USPC ........................................ 358/1.16; 358/3.28
(58) Field of Classification Search
CPC ....... H04N 1/21; H04N 1/32; H04N 1/32267; H04N 1/32277
USPC ........ 358/1.1, 3.28, 1.16, 1.17, 401, 404, 444
See application file for complete search history.

(56) References Cited

U.S. PATENT DOCUMENTS 6,192,138 B1 *  2/2001  Yamadaji ..................... 382/100
6,421,450 B2 *  7/2002  Nakano ......................... 382/100

FOREIGN PATENT DOCUMENTS

JP    2002-127409 A    5/2002

* cited by examiner

*Primary Examiner* — Thomas D Lee
(74) *Attorney, Agent, or Firm* — Fitzpatrick, Cella, Harper & Scinto

(57) ABSTRACT

If a fallback processing involving lossy compression occurs in PDL data including a special pattern, such as a texture pattern, an electronic watermark, or an Anoto pattern, the performance of the special pattern cannot be sufficiently exhibited by image degradation due to the compression. Moreover, in order to obtain an image quality capable of sufficiently exhibiting the performance of the special pattern, a high-capacity memory is necessary to raise the cost. Document information and additional information are sequentially received from other device, and a pre-preparation processing for bit-mapping the document information is started, and upon receipt of the additional information by a receiving unit, a bit map is generated using the information (display list) obtained by the pre-preparation processing for the document information. The generated bit map is compressed and the compressed bit map is associated with the information that is obtained by the pre-preparation processing for the additional information.

12 Claims, 10 Drawing Sheets

IMAGE PROCESSING DEVICE AND IMAGE PROCESSING METHOD FOR REDUCING IMAGE DEGRADATION

BACKGROUND OF THE INVENTION

1. Field of the Invention

The present invention relates to image forming devices and image forming methods for outputting onto print data an image that additional data is embedded.

2. Description of the Related Art

Recently, a technique has been developed for improving the value of a printout itself by adding a special pattern, such as a copy-forgery-inhibited pattern (a texture pattern), an electronic watermark, or an Anoto (registered trademark) pattern, to a printout, and has been implemented in image forming devices.

The texture pattern comprises a latent image pattern constituting a latent image portion, which appears on reproduction and is output, and a background pattern constituting a background portion whose dot disappears on reproduction. By generating (creating) a printout (printed material) wherein a combination of these patterns is superimposed over or under an image desired to be printed, the latent image pattern appears when attempting to reproduce this printout.

In the case of the electronic watermark, a printout is generated by adding a pattern, in which meaningful information is embedded, to an image to be printed. By analyzing the pattern when this printout is scanned, the embedded information can be extracted and used as electronic information.

The Anoto pattern is one of electronic watermark which Anoto Group AB of Sweden has developed, and is a pattern where positional information on a paper is embedded.

The processing when these special patterns are sent together with print data as PDL data from a host to a printer is described below.

The printer generates intermediate data from this PDL data first, and stores the intermediate data into an intermediate data storage buffer. Once all of the intermediate data are stored, the intermediate data are rasterized, and an image is generated and printed (i.e., a printed material is prepared).

However, the data amount of the intermediate data may be large and thus the intermediate data storage buffer may be filled. In such a case, a fallback processing is performed in the conventional art.

The fallback processing is a processing, in which in the middle of generating intermediate data and storing the data into a buffer, the intermediate data stored in the intermediate data storage buffer is rendered once and subjected to JPEG compression. It is needless to say that when this processing is performed, the intermediate data ended midway will be deleted from the buffer.

Thus, a space is made in the intermediate data storage buffer, so that the intermediate data subsequently generated can be stored in the intermediate data storage buffer. Although it looks everything works well here, there is also a problem, which is in JPEG compression.

The special pattern is a pattern without periodicity, the on/off of which is frequently repeated. An image of such a pattern has many high frequency components as compared with an ordinary natural image or a graphic image, and therefore even if it is compressed by JPEG compression, the data amount cannot be significantly reduced. It is needless to say there is one idea that in order to reduce the data amount, the compression is performed with an increased compression ratio, but in such a case, image degradation becomes severe and the functionality as a texture pattern, an electronic watermark, or an Anoto pattern will degrade or otherwise will not work at all.

In order to avoid such a problem, Japanese Patent Laid-Open No. 2002-127409 discloses a method for applying a lossless compression, not the lossy compression such as JPEG compression, to print data including the special pattern.

On the other hand, as in Japanese Patent Laid-Open No. 2002-127409, if an image including the special pattern is subject to a lossless compression, the size of the compressed image will increase. As a result, in order to store the compressed image, a memory larger than the one in the case where JPEG compression is performed needs to be prepared.

SUMMARY OF THE INVENTION

The present invention has been made in view of the above circumstances and provides an image forming device and an image forming method capable of reducing the image degradation due to the fallback processing.

An image forming device of the present invention comprises: a receiving unit configured to receive document information and additional information; an intermediate data generation unit configured to sequentially generate intermediate data for generating a raster image from the received information; a first buffer sequentially storing the generated intermediate data; a second buffer; and a compression unit configured to generate a raster image compressed from the intermediate data of the document information in the first buffer and store the raster image into the second buffer, and delete the intermediate data of the document information in the first buffer, when the received additional information includes a command to draw a special pattern.

As described above, according to the present invention, an image forming device and an image forming method capable of reducing the image degradation due to the fallback processing can be provided.

Further features of the present invention will become apparent from the following description of exemplary embodiments (with reference to the attached drawings).

DESCRIPTION OF THE EMBODIMENTS

Hereinafter, the best modes for implementing the present invention will be described with reference to the accompanying drawings. However, the components described in the embodiments are for illustration only, and are not intended to limit the scope of the present invention thereto.

Embodiment 1

Configuration of Controller Software

Figure 1:
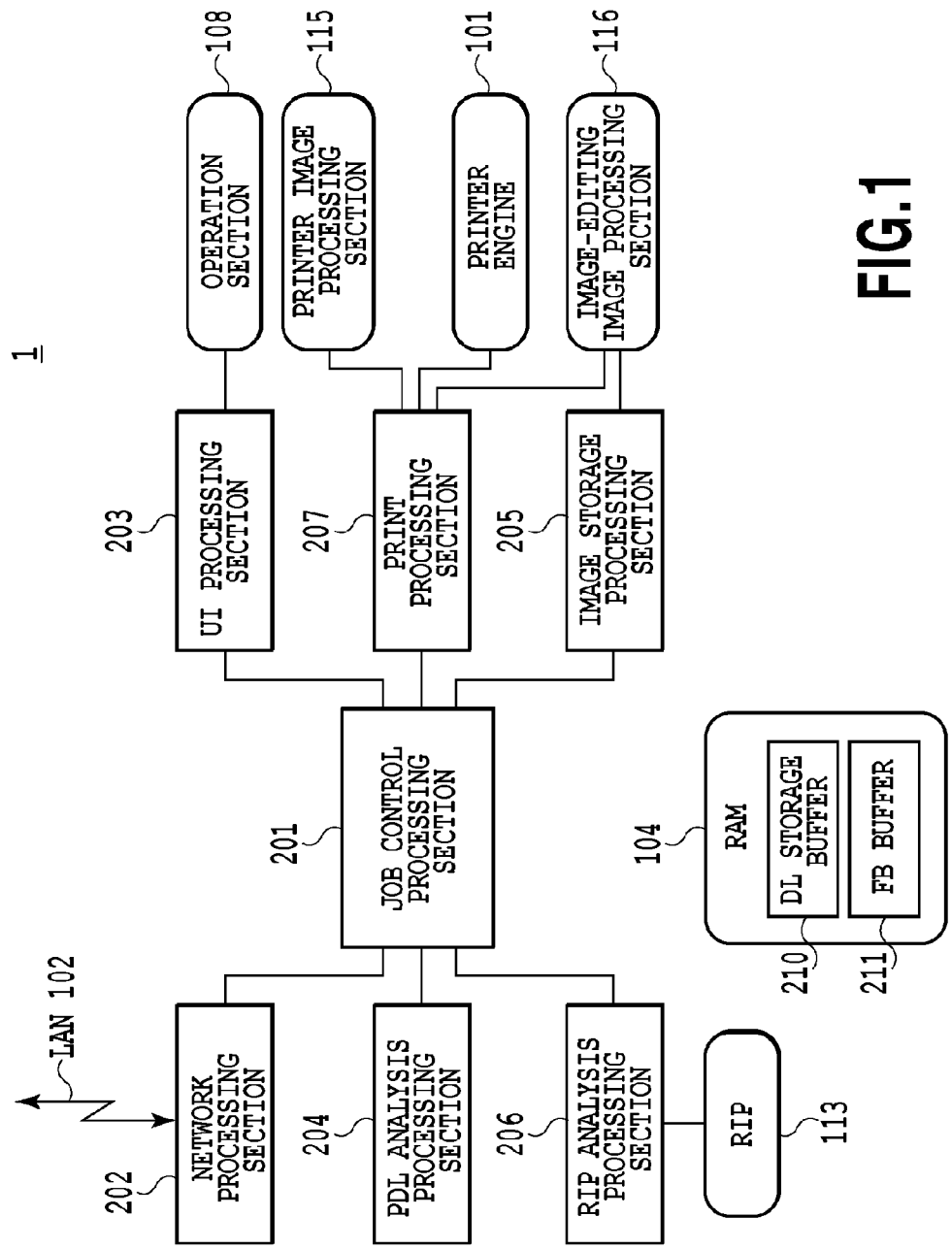
FIG. 1 is a block diagram showing the configuration of controller software in one embodiment of the present invention.

FIG. 1 is a block diagram showing the configuration of a color SFP (Single Function Printer) 1 as one example of an image forming device according to the embodiment.

Reference numerals 201-207 represent software modules. These are the modules realized by a CPU in the color SFP 1 that reads out a program in a ROM to a RAM as required and executing the same.

Moreover, each software module can freely access a DL (display list) storage buffer 210 and a fallback (FB) buffer 211 in the RAM.

A job control processing section 201 shown in FIG. 1 controls all the jobs generated in the color SFP 1.

A network processing section 202 controls communication with an external device via a LAN 102. For example, upon receipt of a control command or data from each device via the LAN 102, the network processing section 202 notifies the content thereof to the job control processing section 201. Moreover, in accordance with a command from the job control processing section 201, the network processing section 202 transmits a control command or data to each device via the LAN 102.

A UI processing section 203 mainly performs the control related to an operation section 108. The operation section 108 notifies the content of an operation, which an operator performs on the operation section 108, to the job control processing section 201, and controls display contents of a display screen on the operation section 108 in accordance with a command from the job control processing section 201.

A PDL analysis processing section 204, in accordance with a command of the job control processing section 201, analyzes the PDL data which the network processing section 202 received, and generates a display list (DL or intermediate data) that can be processed by a RIP processing section 206. The PDL analysis processing section 204 stores the generated DL into the DL storage buffer 210 on a RAM 104, and notifies the address indicative of an area, where the DL has been stored, to the job control processing section 201.

The RIP processing section 206 causes a RIP 113 to perform rendering of the DL stored in the DL storage buffer 210. By this rendering, a raster image (image) is generated in the unit of a band on the memory. In addition, the RIP processing section 206 notifies the storage address of each band on the memory to the job control processing section 201.

An image storage processing section 205, upon receipt of a command of the job control processing section 201, causes an image-editing image processing section 116 to perform a compression processing with respect to an indicated image and store the image after compression into a specified buffer on the RAM 104. The command by the job control processing section 201 is made by notifying the storage address to the image storage processing section 116. The image storage processing section 205 further notifies the storage address in the buffer to the job control processing section 201.

A print processing section 207, in accordance with a command of the job control processing section 201, controls the image-editing image processing section 116, a printer image processing section 115, and a printer engine 101 to perform the print processing of an image.

Note that, the command of the job control processing section 201 includes the storage address of an image after compression to be printed, image-related information (the size of an image, a color mode, a resolution), layout information (an offset, scaling, imposition), and information (a size, a print direction) about an output paper.

Upon receipt of these commands, the image-editing image processing section 116 and the printer image processing 115 perform an appropriate image processing on the image, and control the printer engine 101 to perform printing to a specified paper. This image processing includes a decompression processing, a scaling processing, a color conversion processing, a resolution conversion processing, an imposition processing, a rotation processing, and the like.

(PDL Data)

FIGS. 3A to 3C are conceptual diagrams of the PDL data which a host computer generates. FIG. 3A shows the PDL data for obtaining a printout to which an overwritten texture pattern is added. FIG. 3B shows the PDL data for obtaining a printout to which an electronic watermark is added. FIG. 3C shows the PDL data for obtaining a printout to which the Anoto pattern is added. Each PDL data includes a drawing command group (401, 403, 405) that is document information, and additional information (402, 404, 406, 407). Each PDL data is generated, on the host computer, from the upper side of the view and is sequentially notified to the color SFP 1. That is, the color SFP 1 receives the document information and the additional information in this order via the network processing section 202.

For example, in the PDL data of FIG. 3A, the drawing command group (401) is first generated on the host computer, and is notified to the color SFP 1. Subsequently, a binary bit map drawing command (402) for drawing a texture pattern is generated as the additional information, and is notified to the color SFP 1. That is, the color SFP 1 receives the PDL data in the order of the drawing command group (401) and the binary bit map drawing command (402). Similarly, the PDL data of FIG. 3B is generated in the order of the drawing command group (403) and a binary bit map command (404) to draw an electronic watermark, and the data in the PDL is notified to the color SFP 1 in the same order. The PDL data of FIG. 3C is generated in the order of the drawing command group (405), a tag (406) indicative of a command for drawing the Anoto pattern, and the drawing command group (407) for drawing the Anoto pattern, and the data in the PDL is notified to the color SFP 1 in the same order.

Here, the drawing command group for drawing the Anoto pattern comprises a command to register a download character and a command to draw this download character. In the embodiment, a binary bit map drawing command to draw a texture pattern, a binary bit map drawing command to draw an electronic watermark, and a tag indicating that subsequent data is an Anoto pattern drawing command will be referred to as a special pattern drawing command.

(PDL Printing Processing)

Next, the processing to generate DL from the received PDL data and generate a raster image in the color SFP 1 is described.

Step 1: First, in order to receive the PDL data as shown in FIGS. 3A to 3C, the network processing section 202 of the color SFP 1 sequentially receives a small piece of this PDL data from the upper portion of the view.

Step 2: The PDL analysis processing section 204 determines whether or not the receipt of the drawing command group (document information) is complete and a small piece of PDL data currently being received has switched to a special pattern (additional information).

The processing to determine whether or not a small piece of PDL data is a special pattern is performed by determining, as a result of the analysis of the PDL data, whether or not the tag information included in the binary bit map drawing command or the tag information at the beginning of the Anoto pattern is detected. If detected, the small piece of PDL data is determined as a special pattern. Note that, in the embodiment, whether or not a small piece of PDL data is a special pattern is determined utilizing the various types of tag information included in the PDL data, but not limited thereto, and the special pattern may be detected using a combination of the drawing commands or using the pattern recognition of a bit map image or a download character.

As a result of the determination in Step 2, if the received small piece of PDL is a drawing command group as with the one received in the processing of the previous Step 1 or if it is a special pattern as with the one received in the processing of the previous Step 1, the process flow proceeds to Step 3. Moreover, as a result of the determination, if it is determined that the small piece of PDL data has switched from a drawing command group to a special pattern, the process flow proceeds to Step A to be described later.

Step 3: The PDL analysis processing section 204 interprets the received small piece of PDL data, generates a DL (generates intermediate data), and stores the same into the DL storage buffer 210 (a first buffer). In this step, DL is sequentially generated and the generated DL is sequentially stored into the DL storage buffer 210.

Step 4: If there is an unreceived small piece of PDL data, the process flow proceeds to Step 1, while if the reception is complete, the process flow proceeds to Step 5.

Step 5: The RIP processing section 206 renders all the DL's stored in the DL storage buffer 210 (in the first buffer) and generates a raster image. In the processing of Step B to be described later, if the storage address of a compressed image is already stored in the DL storage buffer 210, this compressed image is decompressed. The generated raster image and the decompressed image are output to the print processing section 207, and the processing completes.

Step A: If it is determined in Step 2 that the small piece of PDL data has switched to a special pattern, all the DL's stored in the DL storage buffer 210 are rendered and a raster image is generated. Subsequently, the rendered data is deleted from the DL storage buffer 210, and the process flow proceeds to Step B.

Step B: The raster image generated in Step A is compressed and stored into an FB buffer 211 (a second buffer). The storage address of the data after compression stored in the FB buffer 211 is stored into the DL storage buffer 210. The process flow proceeds to Step 3.

As described above, according to the embodiment, when the DL generation processing of a drawing command group (document information) completes and a target for DL generation switches to a special pattern, a raster image is generated from a DL in the DL storage buffer 210 and compressed and the DL in the DL storage buffer 210 is deleted. Accordingly, the DL generation processing with respect to a special pattern is started in the state where there is a sufficient free space in the DL storage buffer 210, and therefore the possibility that the fallback processing occurs in the middle of the DL generation processing with respect to a special pattern can be suppressed. As a result, a degradation in the image of a special pattern due to the lossy compression in the fallback processing can be reduced.

Note that, in the embodiment, as a result of the determination in Step 2, if it is determined that a small piece of PDL data has switched from a drawing command group to a special pattern, the processings of Steps A and B are performed, but as a variant, the following processing may be performed.

That is, before performing the processing of Step A, a free space of the DL storage buffer 210 is compared with the whole DL capacity for the special pattern generated, and if the free space is larger, the process flow proceeds to Step 3, otherwise the process flow proceeds to Step A. Note that, when the special pattern is texture pattern data or an electronic watermark, the capacity of a DL can be estimated from the size information about a binary bit map included in a binary bit map drawing command of the PDL. Moreover, when the special pattern is the Anoto pattern, the capacity of a DL can be estimated from the capacity of a download character and the paper size. The detail of the estimation method will be described in Embodiment 2.

In this manner, the processings of Steps A and B are performed only when the free space for DL is small, and therefore a decrease in the print processing speed of PDL data can be suppressed.

Embodiment 2

Hereinafter, Embodiment 2 is described. In the embodiment, the detail of the PDL printing processing including the processing by the color SFP 1 described in Embodiment 1 and other additional processing is described. Because the configuration of a control unit of the color SFP in the embodiment, the configuration of the controller software, and the configuration of the PDL data are the same as those of FIG. 1 and FIG. 3 described in Embodiment 1, the description thereof is omitted.

(PDL Printing Processing)

The PDL printing processing until the color SFP 1 that is one example of the image forming device according to the embodiment receives PDL data from a host computer on the LAN 102 and prints the same onto a paper is described with reference to a flow chart of FIG. 2.

The network processing section 202, upon receipt of PDL data from the external network LAN 102, notifies this PDL data to the job control processing section 201. Then, in order to analyze the notified PDL data, the job control processing section 201 activates the PDL analysis processing section 204 and notifies the PDL data.

In S301, the PDL analysis processing section 204 analyzes the notified PDL data so as to generate DL. The PDL analysis processing section 204 further stores the generated DL into the DL storage buffer 210, and notifies the address of the stored DL to the job control processing section 201. This operation of the PDL analysis processing section 204 will be described in detail later. The job control processing section 201, upon receipt of the notification of the storage address of the DL from the PDL analysis processing section 204, activates the RIP processing section 206 and the image storage processing section 205.

In S302, the RIP processing section 206 causes the RIP 113 to perform rendering of the DL stored in the DL storage buffer 210. By this rendering, a raster image (e.g., a binary image) is generated in the unit of a band in the image buffer on the RAM 104. In addition, the RIP processing section 206 notifies the storage address of each band to the job control processing section 201. Then, the job control processing section 201 notifies the storage address of the each band to the image storage processing section 205.

In S303, the image storage processing section 205 performs a lossless compression processing with respect to an image stored in this storage address, and stores the image after compression into the specified buffer on the RAM 104. Moreover, the image storage processing section 205 notifies the storage address of the image after compression to the job control processing section 201.

Note that, these rendering and compression/storage processings are performed in the unit of a band, the band being obtained by dividing a page into a plurality of portions. When the rendering and compression/storage processing of all the bands complete, the process flow proceeds to S304. Thereafter, the job control processing section 201 puts together the compressed raster data of all the bands and manages the resulting date as image data. Note that this compression is JBIG compression, for example.

In S304, the job control processing section 201 activates the print processing section 207 to perform the print processing of the image. The specific processing in this case is as described in the description of the print processing section 207.

(PDL Analysis Processing)

Figure 2:
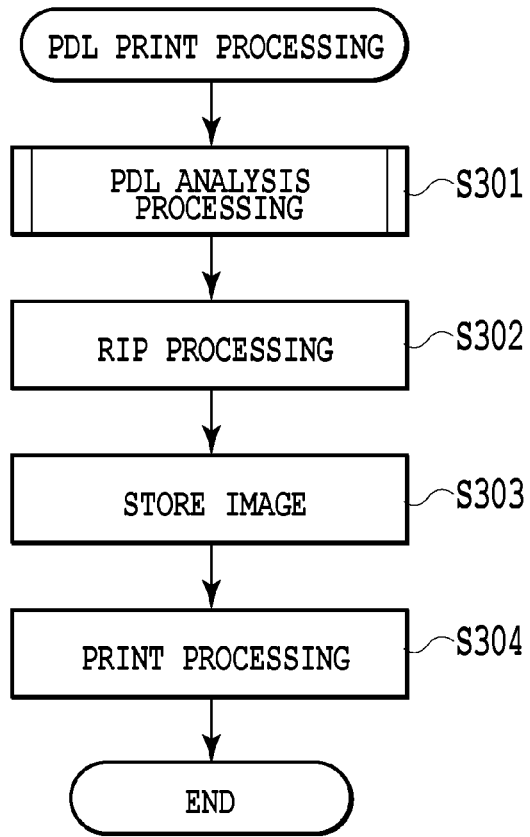
FIG. 2 is a flow chart showing a PDL printing processing of a color SFP in Embodiment 2 of the present invention.
Figure 4:
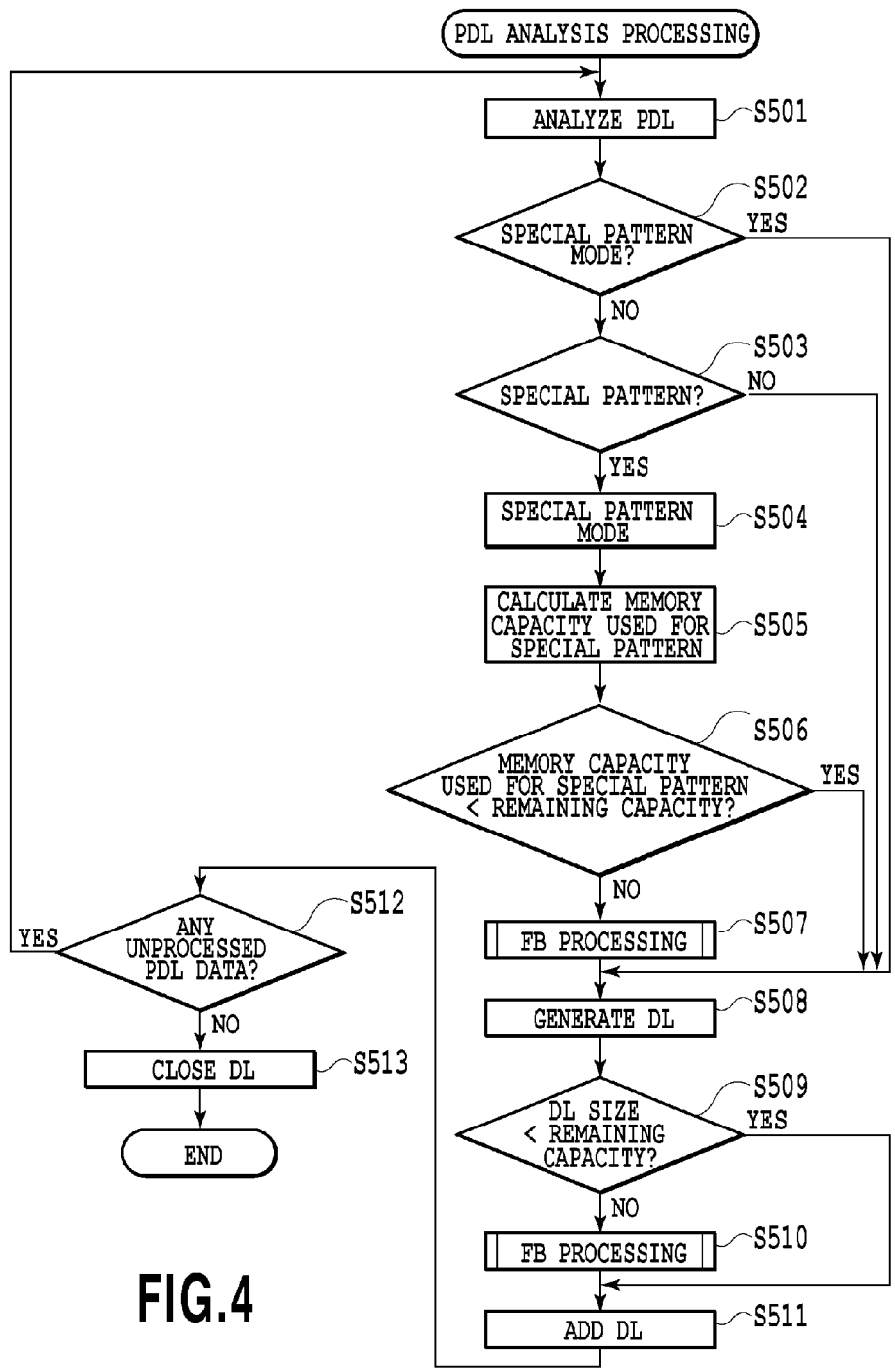
FIG. 4 is a flow chart showing a PDL analysis processing in Embodiment 2 of the present invention.

Here, with reference to a flow chart of FIG. 4, the processing performed by the PDL analysis processing section 204 in S301 of FIG. 2 is described.

Figure 3:
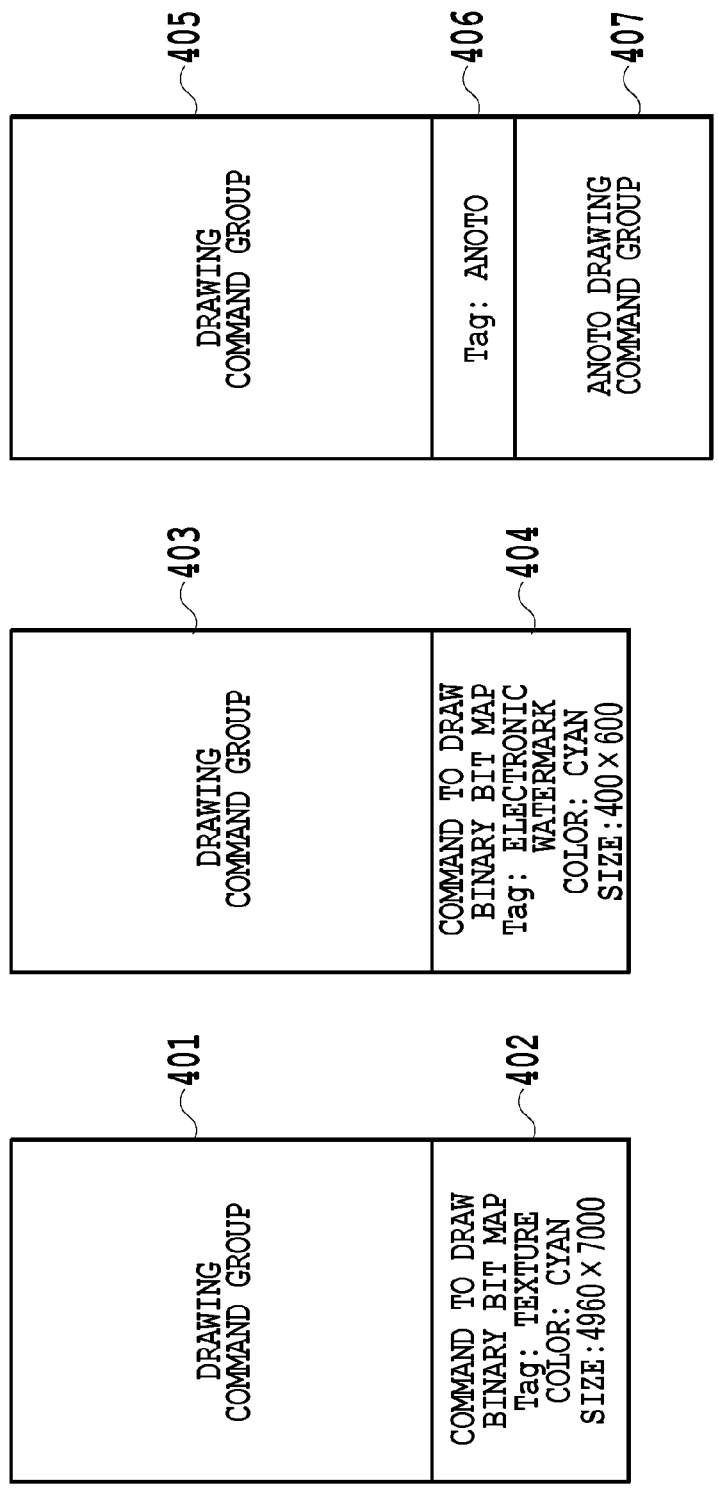
FIGS. 3A to 3C are conceptual diagrams of PDL data in Embodiments 1 and 2 of the present invention.

The PDL analysis processing section 204, upon notification of the PDL data illustrated in FIG. 3, sequentially analyzes the PDL data (S501), and performs branching of the processing depending on a currently set state (mode) and the result of the analysis (S502, S503).

That is, if the currently set mode is a special pattern mode, the process flow proceeds to S508. If the currently set mode is not a special pattern mode and if the analysis result of PDL indicates a special pattern, the process flow proceeds to S504. If the currently set mode is not a special pattern mode and if the analysis result does not indicate a special pattern, the process flow proceeds to S508.

Here, the currently set mode indicates whether or not the PDL data currently being processed is a special pattern. The initial mode when the processing shown in FIG. 4 starts is already set to a normal mode (a mode that is not the special pattern mode). Therefore, at first, the process flow will proceed from S502 to S503 after S501. Subsequently, in S503, it is determined whether or not a drawing command to draw a special pattern has been detected, but if not detected, the process flow proceeds to S508. On the other hand, once detected, the process flow proceeds to S504, where the special pattern mode is set.

The above-described processings in S502 and S503 are summarized as follows. That is, the process flow always proceeds from S503 to S508 until a special pattern is detected for the first time. Only when a special pattern is detected, the processings of S504 to S507 will be performed, but once the processings are completed, a process flow from S502 to S508 is established. That is, according to the processing of S503, whether or not a special pattern is detected from a binary bit map drawing command (additional information) is determined based on the fact that the DL's (intermediate data) for all the drawing command groups (document information) are generated and the storing of all the DL's into the DL storage buffer 210 is complete. If a special pattern is detected, the processings of S504 to S507 are performed.

Note that, in a special pattern determination processing of S503, as a result of the analysis of PDL data, if the tag information included in a binary bit map drawing command or the tag information at the beginning of the Anoto pattern is detected, it is determined that a special pattern has been detected. Note that, in the embodiment, whether or not there is any special pattern is detected using the various types of tag information included in PDL data, but a special pattern may be detected using a combination of the drawing commands or using the pattern recognition of a bit map image or a download character.

In S504, the current mode is set to the special pattern mode, and then in S505, the capacity of a DL that is generated in order to draw a special pattern is estimated. In estimating the DL capacity, if the special pattern is texture pattern data or an electronic watermark, the capacity of DL can be estimated using the size information about a binary bit map included in the binary bit map drawing command. Note that the size information about the binary bit map is included in the head section of the binary bit map drawing command.

For example, if the size of the binary bit map included in the binary bit map drawing command is 4960×7000, the capacity of the binary bit map is 4960×7000/8=approximately 4.139 Mbytes. The capacity of DL for drawing a binary bit map is (the capacity of the binary bit map)+(control command (60 bytes) for drawing the binary bit map). Therefore, the capacity of DL for drawing a binary bit map may be estimated as 4.14 Mbytes.

If the special pattern is the Anoto pattern, the capacity of DL for drawing a binary bit map may be estimated from the capacity of a download character and the output paper size. For example, although the Anoto pattern comprises a combination of approximately 120 types of download characters, the average size of the bit map of each character is approximately 30 pixels. Because the capacity in DL required for registration of one download character is approximately 8 bytes, 120*8=960 bytes are consumed for registration of the download character. Moreover, if the paper size is A4, the size of the drawing area is 4960*7000 pixels, and therefore the Anoto pattern can comprise 4960*7000/30=approximately 1157000 characters. On the other hand, because the command capacity in DL for drawing one download character is approximately 10 bytes, the Anoto pattern can comprise 1157000*10=approximately 11.04 Mbytes. This reveals that, for the A4 size paper, it would be sufficient that the capacity of the size of DL to be used, including the capacity for registration of the download character, is estimated as 11.1 Mbytes.

As described above, according to the processing of S505, if a special pattern is detected from a binary bit map drawing command (additional information), the capacity of the DL of a special pattern is calculated.

In S506, the capacity of DL for drawing a special pattern estimated in S505 is compared with the remaining capacity of the DL storage buffer 210 on the RAM 104, and if the remaining capacity is larger, the process flow proceeds to a DL generation processing of S508, while if the remaining capacity is smaller, the process flow proceeds to a fallback processing of S507. That is, in S506, it is determined whether or not the remaining capacity of the DL storage buffer is smaller than the calculated capacity of the DL of a special pattern.

In S507, the already generated DL is rendered once and compressed and stored into the FB buffer 211, thereby the fallback processing for securing a free space in the DL storage buffer 210 is performed. That is, in S506, if the remaining capacity of the DL storage buffer 210 is determined as smaller than the calculated capacity of the DL of a special pattern, a raster image is generated from a DL in the DL storage buffer 210 and compressed, and the compressed raster image is stored into the FB buffer 211. Subsequently, the intermediate data in the DL storage buffer 210 is deleted. The process flow then proceeds to S508. The fallback processing will be described in detail later.

In S508, the DL generation processing is performed in accordance with the analysis result of the PDL data in S501, and the process flow proceeds to S509. Note that, if the DL generation processing is performed in S508 following the fallback processing in S507, the DL generation processing of a special pattern is started. This is because the fallback processing of S507 is the processing that is performed when a special pattern is detected from a binary bit map drawing command in S503 after the DL's for all the drawing command groups are generated. Moreover, in this case, at the starting point of the processing of S508, DL (at least some of DL's) is already deleted from the DL storage buffer 210. This is because the DL generation processing is performed in S508 after the DL stored in the DL storage buffer 210 is deleted in the fallback processing of S507.

In this manner, in starting the generation of the DL of a special pattern, the DL is already deleted from the DL storage buffer 210. Therefore, the possibility that a fallback processing of S510 to be described later is performed due to running out of the remaining capacity of the DL storage buffer 210 in the middle of the generation processing of the DL of a special pattern can be reduced. As a result, the fallback processing can be performed on a special pattern, and a degradation in the image of the special pattern due to the lossy compression, such as JPEG, can be reduced.

In S509, the capacity of the DL generated in S508 is compared with the remaining capacity of the DL storage buffer 210, and if the remaining capacity is larger, the process flow proceeds to S511, while if the remaining capacity is smaller, the fallback processing is performed in S510. Note that the fallback processing of S507 and the fallback processing of S510 are the same.

In S511, the DL generated in S508 is added to the DL storage buffer 210, and the remaining capacity is reduced by the size of the added DL, and then the process flow proceeds to S512.

In S512, whether or not there is any unprocessed PDL data is determined, and if there is any unprocessed PDL data, the process flow returns to S501, where the analysis processing of PDL is continued, while if all the analysis processings of PDL data are already done, the process flow proceeds to S513.

In S513, a close processing of the generated DL is performed so that the analysis of DL can be performed in the RIP 113. The address of the closed DL is notified to the job control processing section 201, and the PDL analysis processing is completed. In the close processing of DL of S513, a total size of the generated DL and the number of objects included in the DL are described in a DL header section, and also the information indicative of the end of the DL is written in the end section of the DL.

(Fallback Processing)

Figure 5:
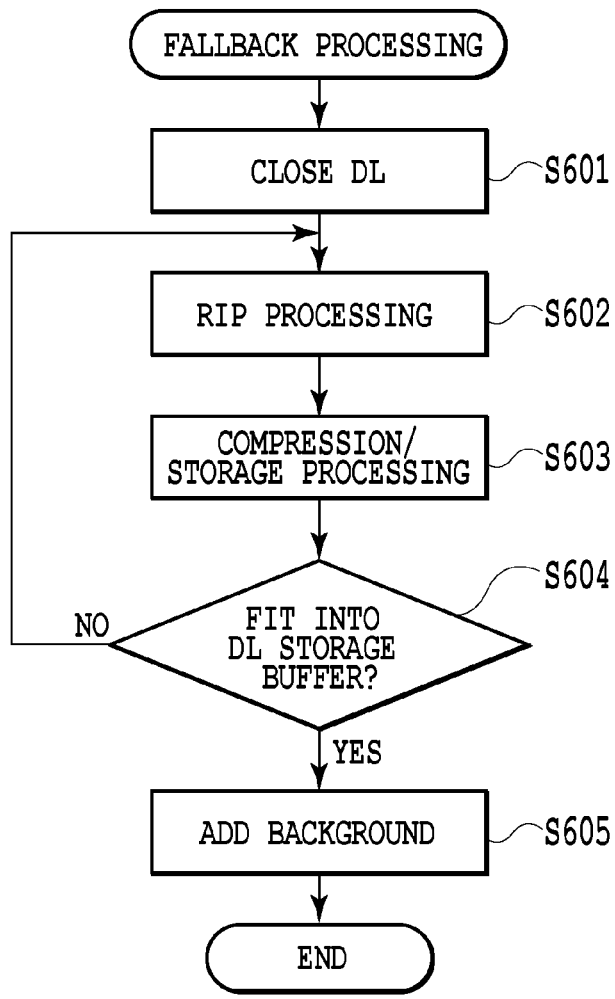
FIG. 5 is a flowchart showing a fallback processing in Embodiment 2 of the present invention.

Next, with reference to a flow chart of FIG. 5 and FIG. 6, the fallback processing of S507 and S510 is described. The fallback processing is executed in cooperation with the PDL analysis processing section 204, the RIP processing section 206, and the image storage processing section 205 under control of the job control processing section 201.

Upon starting the fallback processing, in S601 the PDL analysis processing section 204 performs the close processing of the DL stored on the DL storage buffer 210. The PDL analysis processing section 204 further adds the address of the closed DL and the information indicating that the DL is generated by the fallback, and notifies these information to the job control processing section 201.

The job control processing section 201, upon receipt of the notification of the DL and fallback from the PDL analysis processing section 204, activates the RIP processing section 206 and the image storage processing section 205. The RIP processing section 206 performs the rendering of the notified DL (S602). The image storage processing section 205 compresses a raster image of the rendered DL, and stores the resulting image into the FB buffer 211 (S603). The rendering and compression/storage processing are performed in the unit of a band, the band being obtained by dividing a page into a plurality of portions. Upon completion of the rendering and compression/storage processing of all the bands, the process flow proceeds to S604.

Specifically, in S602, the RIP processing section 206, upon receipt of the notification of DL from the job control processing section 201, performs the rendering in the unit of a band. The RIP processing section 206 notifies a raster image generated by rendering to the image storage processing section 205 via the job control processing section 201. In the fallback processing, a raster image which the RIP processing section 206 generates is a multivalued image because it needs to be combined with the DL that is generated after the fallback.

In S603, in the image storage processing section 205, the raster image, fallback buffer 211, and compression parameter are specified by the job control processing section 201. The image storage processing section 205 generates an irreversible compressed image (a lossy compressed image), for example, by performing JPEG compression on the relevant raster image utilizing a JPEG compression module of the image-editing image processing section 116. The image storage processing section 205 attempts to store this compressed image into the fallback buffer 211, and notifies the job control processing section 201 of the compression result of determining whether or not the compressed image has been fit into the fallback buffer 211.

In S604, the job control processing section 201 determines whether or not the raster image has been stored into the fallback buffer 211, with reference to the compression result notified from the image storage processing section 205. If the compression result indicates that the raster image is not fit into the fallback buffer 211 and has not been stored into the fallback buffer 211, the process flow returns to S602, where the RIP processing and the compression/storage processing are repeated.

In S603 to be re-executed, the job control processing section 201 notifies a compression parameter, which allows a raster image to be compressed with a higher compression ratio, to the image storage processing section 205, so that a compressed image can be stored into the fallback buffer 211. As the compression parameter, specifically, a Q rate is notified.

In S604, if the job control processing section 201 determines that the raster image has been stored in the fallback buffer 211, the process flow proceeds to S605.

In S605, the job control processing section 201 notifies the PDL analysis processing section 204 of the address of a compressed raster image of all the bands. The PDL analysis processing section 204, upon receipt of the notification of the address of the compressed raster image, generates DL with this compressed raster image as a background image, and completes the fallback processing. The DL generated here is a control command for drawing a JPEG-compressed raster image, and includes the link information to the compressed raster image in the FB buffer 211. The size of this control command is on the order of several hundred bytes, and will be very small, considering the whole DL.

As described above, according to the fallback processing shown in FIG. 5, all the DL's that are already generated at the starting point of this processing are rendered and a raster image is generated, and this raster image is JPEG-compressed and stored into the FB buffer 211. By combing this JPEG-compressed raster image with the DL, which is subsequently generated after the fallback processing, during rendering, a final raster image can be generated. Specifically, this combining processing is performed by overwriting a drawing object, which is generated by developing DL, with the raster image generated by the fallback processing as a background.

Figures 6A, 6B:
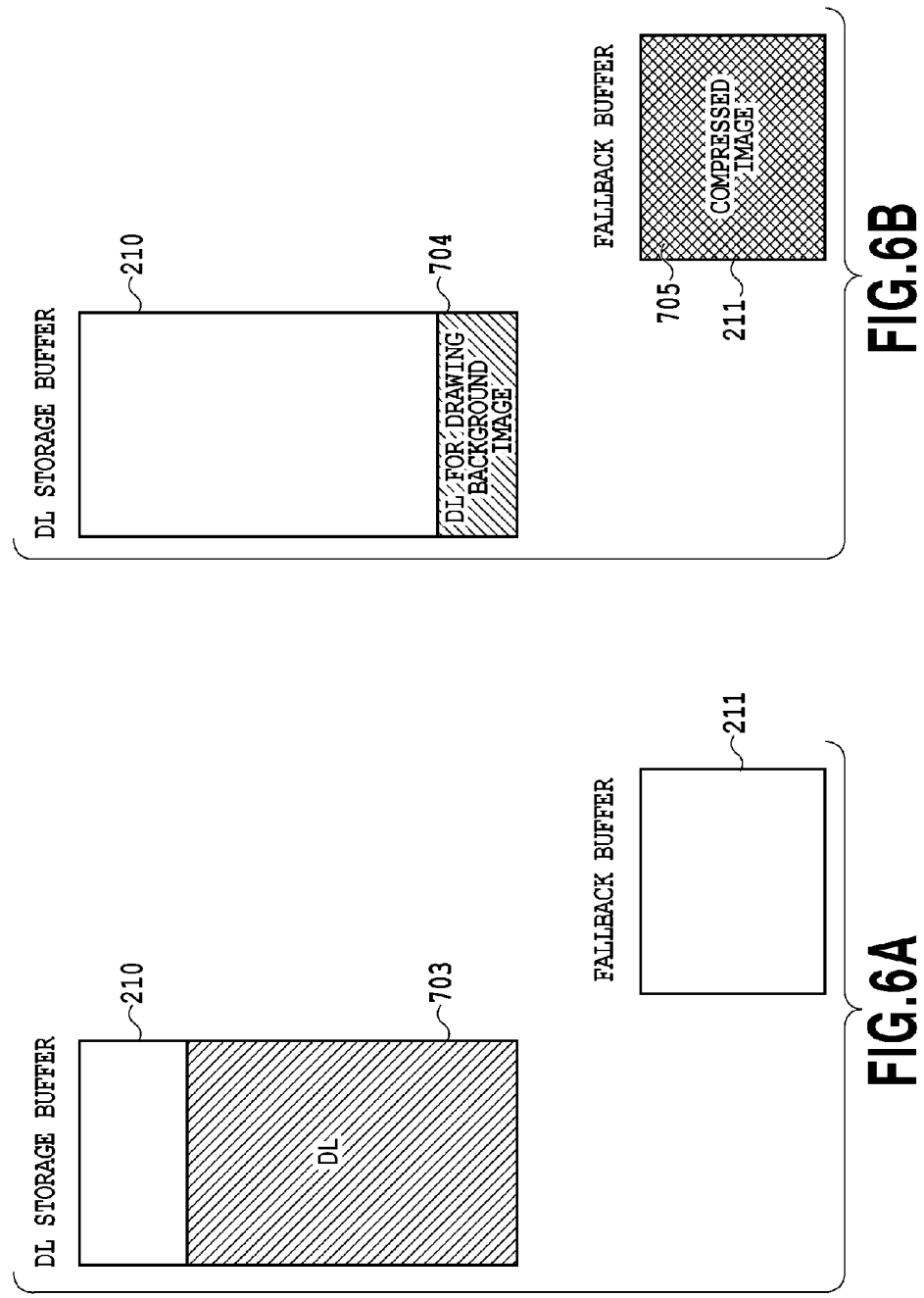
FIGS. 6A and 6B are schematic views of a DL storage buffer before and after the fallback processing in Embodiment 2 of the present invention.

FIGS. 6A and 6B are schematic diagrams of the DL storage buffer 210 and the fallback buffer 211 on the RAM 104 in the fallback processing. FIG. 6A shows the state of each buffer at the start of the fallback. The DL generated in the PDL analysis processing of FIG. 4 is stored into the DL storage buffer 210, while in the fallback buffer 211, a raster image which the image storage processing section 205 compresses in the fallback processing of FIG. 5 is stored.

Reference numeral 703 in FIG. 6A represents the DL which the PDL analysis processing section 204 generates. This DL is rasterized by the RIP processing section 206 in the fallback processing, and is compressed by the image storage processing section 205 and stored into the fallback buffer 211.

FIG. 6B shows the state of each buffer when the fallback processing is complete, wherein a raster image JPEG-compressed by the image storage processing section 205 is stored in the fallback buffer 211. In the DL storage buffer 210, the DL for combining the compressed raster image, which is generated in S605, as a background image is stored. Moreover, the DL for combining the compressed raster image as this background image is a control command for drawing a JPEG-compressed raster image, and includes the link information to the compressed image in the fallback buffer.

As described above, according to the embodiment, when the PDL data including a special pattern, such as texture pattern data, an electronic watermark, or Anoto data, is received, the fallback is generated prior to generating DL from the special pattern. Thus, by rendering and compressing the DL that does not include the special pattern, a space is made in the DL storage buffer 210, thereby ensuring that the DL of the special pattern is stored. Thus, the possibility that the fallback occurs during the generation of the DL of a special pattern can be reduced, and a degradation in the image of the special pattern due to JPEG compression, which is lossy compression, subjected to the special pattern can be reduced.

Furthermore, according to the embodiment, when the special pattern is received, if there is a sufficient space capable of storing the DL for drawing a special pattern in the DL storage buffer 210, the fallback processing will not be performed. Thus, a degradation in the image or a decrease in the processing speed due to an unnecessary fallback processing is prevented.

Embodiment 3

Hereinafter, Embodiment 3 is described. The configuration of a color SFP, the configuration of a control unit, the configuration of controller software, and the basic operation of PDL printing processing in the embodiment are the same as those shown in FIG. 1 and FIG. 2 described in Embodiments 1 and 2, and therefore the description thereof is omitted.

Figure 7:
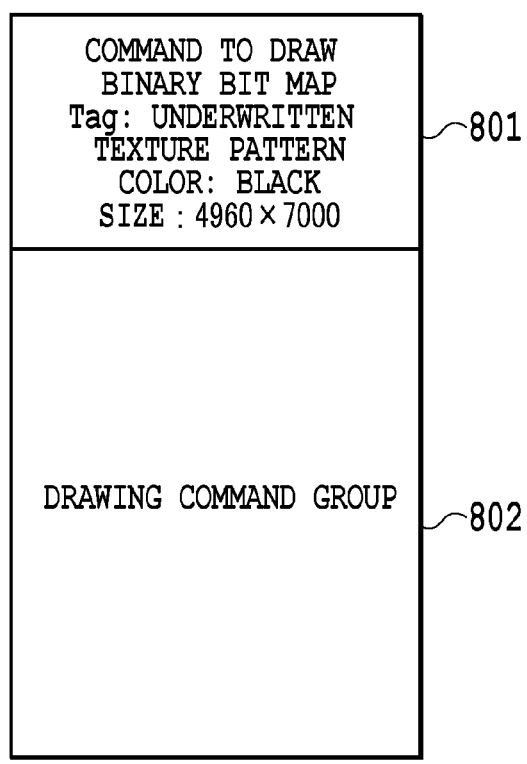
FIG. 7 is a conceptual diagram of PDL data including an underwritten texture pattern in Embodiment 3 of the present invention.

Hereinafter, the PDL analysis processing section 204 in the embodiment is described with reference to FIGS. 7A to 10. In the color SFP in the embodiment, in addition to the PDL data illustrated in FIGS. 3A to 3C, PDL data illustrated in FIGS. 7A and 7B is printed.

(PDL Data)

FIGS. 7A and 7B show PDL data for obtaining an image output added by an underwritten texture pattern, which is a pattern wherein a texture pattern is drawn only in a portion without a drawing object of image data. On the host computer, data is generated from the upper side of the view, and is sequentially notified to the color SFP. That is, a binary bit map drawing command to draw a texture pattern (801) is generated first, and is notified to the color SFP, and subsequently a drawing command group (802) for drawing the image before adding the texture pattern is generated and notified. Note that, tag information indicating that this is the command for drawing the underwritten texture pattern is added to the binary bit map drawing command, so that during the analysis of this command, the fact that this command is for the underwritten texture pattern can be easily identified distinguishing from the command for an overwrite texture pattern or an electronic watermark.

(PDL Analysis Processing)

Figure 8:
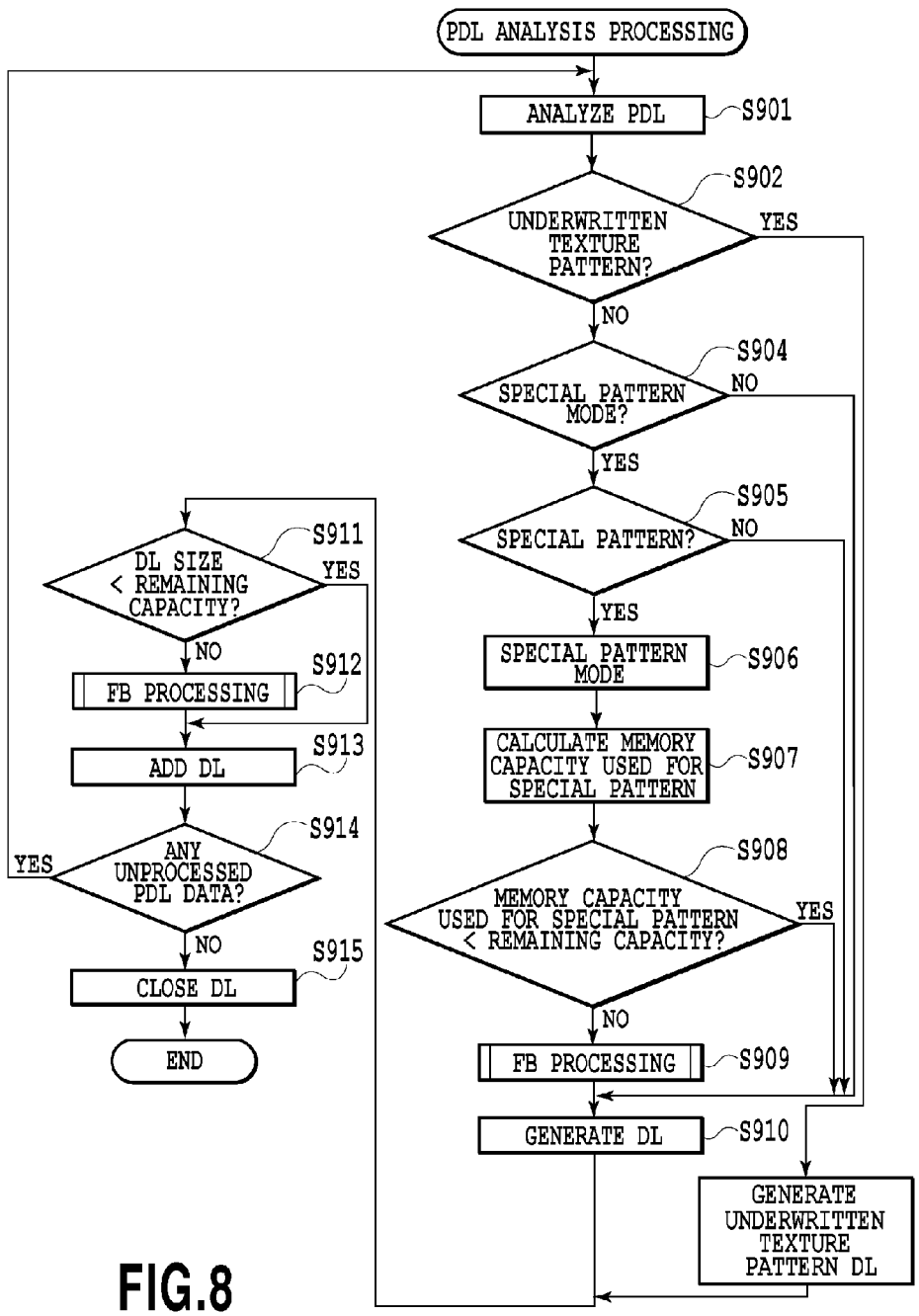
FIG. 8 is a flow chart showing the PDL analysis processing in Embodiment 3 of the present invention.

Here, the processing by the PDL analysis processing section 204 of the embodiment is described with reference to a flow chart of FIG. 8.

The PDL analysis processing section 204, upon notification of the PDL data illustrated in FIGS. 3A and 3B and FIGS. 7A and 7B, sequentially analyzes the data (S901), and performs branching of the processing depending on the result of the analysis and the current state (S902, S904, S905).

If the PDL analysis result in S901 indicates an underwritten texture pattern, the process flow proceeds to S903, where the DL for the underwritten texture pattern is generated. With regard to the DL for an underwritten texture pattern, the information portion used for drawing in the RIP 113 does not differ from a DL command to draw other binary bit map. However, into an area to be skipped in the RIP 113, the information indicating that this is the DL for an underwritten texture pattern is embedded. Moreover, the size of the DL for an underwritten texture pattern also includes the size of a background drawing DL for fallback, which needs to be separately added when the FB occurs, and which is used in a DL addition processing in S913.

After generating the DL for an underwritten texture pattern in S903, the process flow proceeds to S911.

On the other hand, in S901, if the PDL analysis result does not indicate the command to draw an underwritten texture pattern, the process flow proceeds to S904 and S905, where branching of the processing is performed depending on the result of the analysis of the PDL data and the current state.

If the current state is a special pattern mode (S904; Yes) or if the command is not a drawing command indicative of a special pattern (S905; Yes), the process flow proceeds to a DL generation processing of S910. Here, the current state is already initialized to a normal mode at the activation of the PDL analysis processing. When a drawing command indicative of a special pattern drawing is detected for the first time in S905, the current state is set to the special pattern mode in S906. After once detecting the drawing command indicative of a special pattern drawing by the determination processing in the special pattern mode of S905, the detection of the special pattern drawing command can be omitted to perform a high speed processing.

In the special pattern determination processing of S905, as a result of the analysis of the PDL data, it is determined, based on the tag information included in a binary bit map or the tag information at the beginning of the Anoto pattern, whether or not it is a special pattern. Note that, in the embodiment, the determination of a special pattern is attempted utilizing the various types of tag information included in the PDL data. However, the determination of a special pattern may be made using a combination of the drawing commands or the pattern recognition of a bit map image or a download character.

After setting the special pattern mode in S906, the capacity of the DL that is generated in order to draw a special pattern is estimated in S907. In estimating the DL capacity, if a special pattern is texture pattern data or an electronic watermark, the capacity of the DL can be estimated from the size of a binary bit map and the size of a command to draw a binary bit map in the DL. Moreover, if the special pattern is the Anoto pattern, the capacity of the DL can be estimated from the capacity of a download character and the paper size.

In S908, the capacity of the DL for drawing a special pattern estimated in S907 is compared with the remaining capacity of the DL storage buffer 210 on the RAM 104. If the remaining capacity is larger, the process flow proceeds to the DL generation processing of S910, while if the remaining capacity is smaller, the process flow proceeds to the fallback processing of S909.

In the fallback processing of S909, in order to secure a free space in the DL storage buffer 210, the already generated DL is rendered once, and is compressed and stored. Thereafter, the process flow proceeds to S910. The fallback processing of the embodiment will be explained in detail later.

In S910, based on the analysis result of the PDL data of S901, the DL generation processing is performed and the process flow proceeds to S911.

In S911, the capacity of the DL generated in S910 is compared with the remaining capacity of the DL storage buffer 210. That is, the capacity of the intermediate data (DL) that is generated at this point from the document information (drawing command group 802) and the additional information (binary bit map drawing command 801) is compared with the remaining capacity of the DL storage buffer 210. If the remaining capacity is larger, the process flow proceeds to S913, while if the remaining capacity is smaller, a fallback processing is performed in S912. Note that the fallback processing of S909 and the fallback processing of S912 are the same.

In S913, the DL generated in S910 is added to the DL storage buffer 210, and the remaining capacity is reduced by the size of the added DL, and then the process flow proceeds to S914.

In S914, whether or not there is any unprocessed PDL data is determined. If there is any unprocessed PDL data, the process flow returns to S901, where the PDL analysis processing is continued, and if all the PDL data are already processed, the process flow proceeds to S915.

In S915, a close processing of the generated DL is performed so that the analysis of the DL can be performed in the RIP 113. The address of the closed DL is notified to the job control processing section 201, and the PDL analysis processing is completed. In the close processing of DL of S915, a total size of the generated DL and the number of objects included in the DL are described in a DL header section, and also the information indicative of the end of the DL is written in the end section of the DL.

(Fallback Processing)

Figure 9:
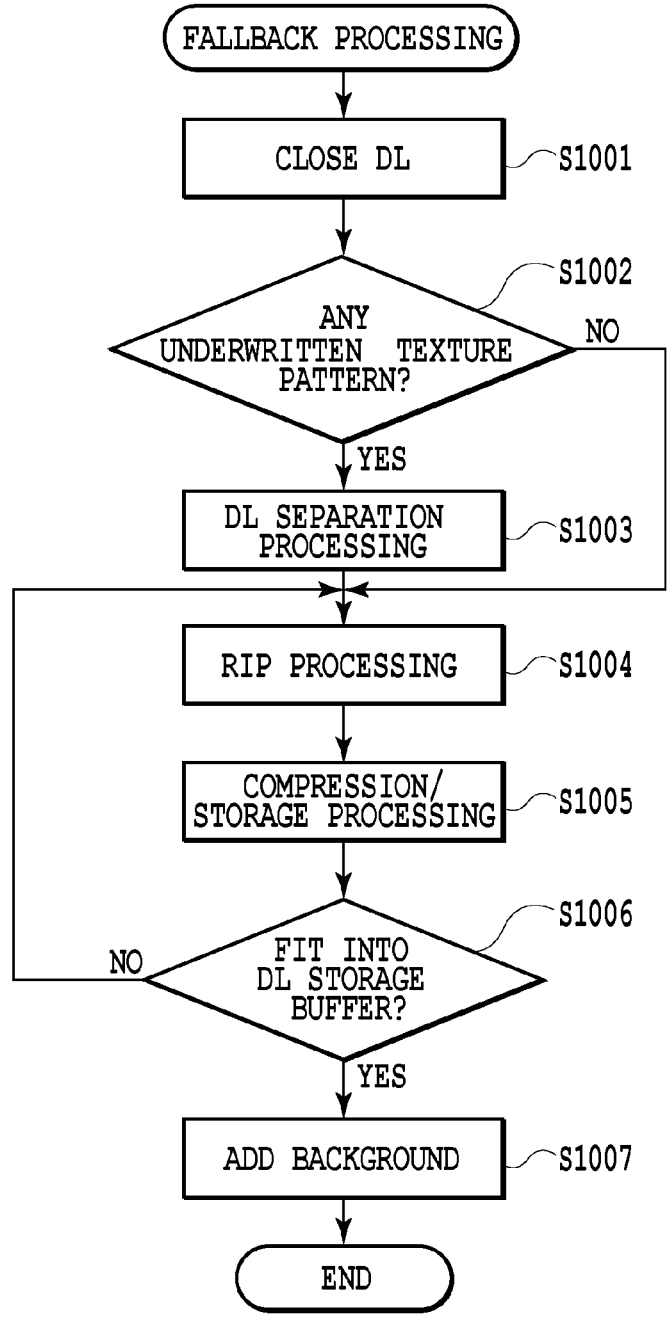
FIG. 9 is a flow chart showing the fallback processing in Embodiment 3 of the present invention.
Figures 10A, 10B:
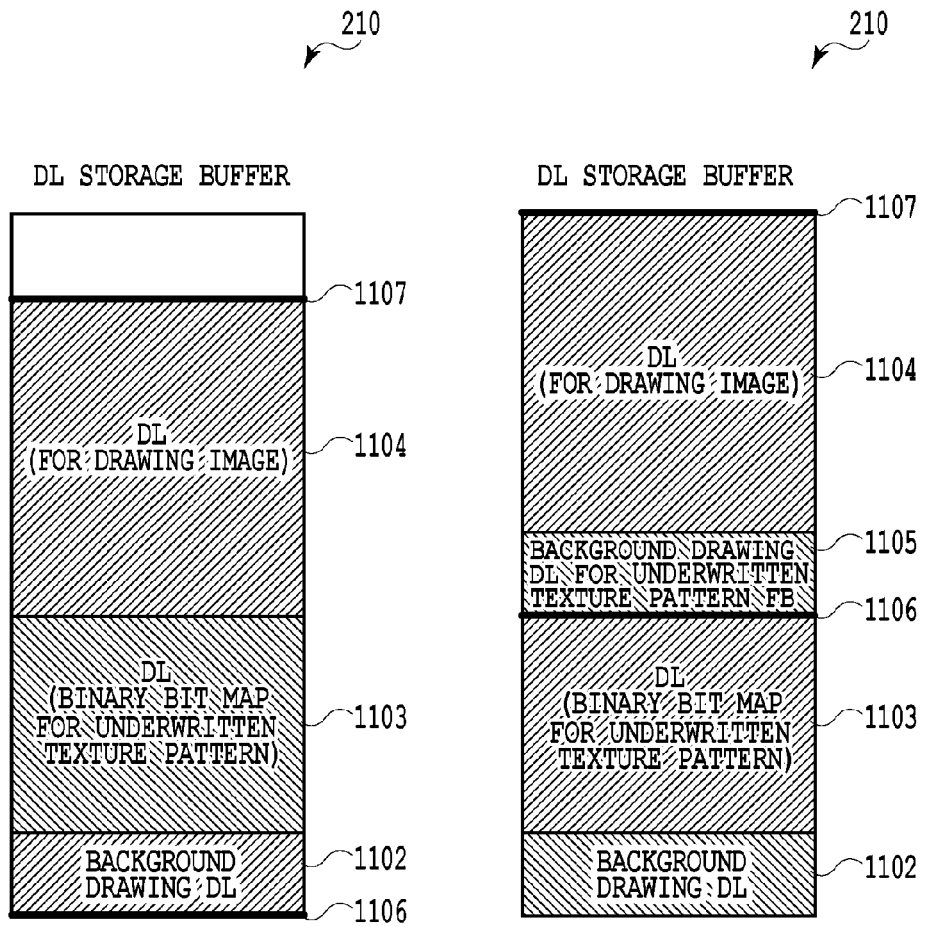
FIGS. 10A and 10B are schematic views of a DL storage buffer for illustrating a DL separation processing in Embodiment 3 of the present invention.

Next, with reference to a flow chart of FIG. 9 and FIGS. 10A and 10B, the fallback processing of S909 and S912 is described. The fallback processing is executed in cooperation with the PDL analysis processing section 204, the RIP processing section 206, and the image storage processing section 205 under control of the job control processing section 201.

Upon starting the fallback processing, in S1001 the PDL analysis processing section 204 performs the close processing of the DL stored on the DL storage buffer 210, and the process flow proceeds to S1002.

In S1002, the PDL analysis processing section 204 determines whether a DL object of an underwritten texture pattern is included in the closed DL, and if included, the process flow proceeds to S1003. If the underwritten texture pattern is not included, the address of the closed DL added with the information indicating that the closed DL is the DL generated by the fallback is notified to the job control processing section 201.

In S1003, the PDL analysis processing section 204 performs a separation processing of the once closed DL. The separation processing of the DL is a processing, wherein from an object to be rendered in the fallback, the DL for drawing an image and the DL for an underwritten texture pattern are separated to reconfigure the DL. The DL is separated, and the rendering and compression processing in the fallback are performed only on the DL for drawing an image, thereby preventing the pattern of an underwritten texture pattern from being degraded by the compression. The PDL analysis processing section 204 notifies the job control processing section 201 of the DL reconfigured in the separation processing. The detail of the DL separation processing is described later with reference to FIGS. 10A and 10B.

The job control processing section 201, upon receipt of the notification of the DL and the fallback from the PDL analysis processing section 204, activates the RIP processing section 206 and the image storage processing section 205 to perform the rendering and compression/storage processing of the notified DL (S1104, S1105). The rendering and compression/storage processing are performed in the unit of a band, the band being obtained by dividing a page into a plurality of portions, and when the rendering and compression/storage processing of all the bands complete, the process flow proceeds to S1006.

In S1004, the RIP processing section 206, upon receipt of the notification of the DL from the job control processing section 201, performs the rendering in the unit of a band on the DL's including the DL for drawing an image separated in S1003 (i.e., the DL's not including the DL of an underwritten texture pattern). The DL to be rendered will be described later with reference to FIG. 10. The RIP processing section 206 notifies a raster image generated by rendering to the image storage processing section 205 via the job control processing section 201. In the fallback processing, a raster image which the RIP processing section 206 generates is a multivalued image because it needs to be combined with the DL that is generated after the fallback.

In S1005, in the image storage processing section 205, the raster image, fallback buffer 211, and compression parameter generated in S1004 are specified by the job control processing section 201. The image storage processing section 205 generates a compressed image by performing JPEG compression on the relevant raster image utilizing the JPEG compression module of the image-editing image processing section 116. The image storage processing section 205 further attempts to store this compressed image into the fallback buffer 211, and notifies the job control processing section 201 of the compression result of determining whether or not the compressed image has been fit into the fallback buffer 211.

In S1006, the job control processing section 201 determines whether or not the raster image has been stored into the fallback buffer 211, with reference to the compression result notified from the image storage processing section 205. If the compression result indicates that the raster image does not fit into the fallback buffer 211 and thus has not been stored therein, the process flow returns to S1104, where the RIP processing and the compression/storage processing are repeated.

In S1005 to be re-executed, the job control processing section 201 notifies a compression parameter, which allows a raster image to be compressed with a higher compression ratio, to the image storage processing section 205, so that a compressed image can be stored into the fallback buffer 211. As the compression parameter, specifically, the Q rate is notified.

In S1006, if the job control processing section 201 determines that the raster image for all bands has been stored into the fallback buffer 211, the process flow proceeds to S1007.

In S1007, the job control processing section 201 notifies the PDL analysis processing section 204 of the address of the compressed raster image of all the bands. The PDL analysis processing section 204, upon receipt of the notification of the address of the compressed raster image, generates DL with this raster image as a background image, and completes the fallback processing.

Here, the content of the DL separation processing in S1003 is described with reference to FIGS. 10A and 10B. FIGS. 10A and 10B are schematic diagrams of the DL storage buffer 210 on the RAM 104 before and after the DL separation processing and the DL included in this buffer. FIG. 10A shows one example of the DL storage buffer 210 before executing the DL separation processing, and FIG. 10B shows the state of the DL storage buffer 210 after performing the DL separation processing on the DL storage buffer 210 of FIG. 10A.

Reference numeral 1102 represents a background drawing DL for drawing a background painted with white or the like. Reference numeral 1103 represents a DL for drawing an underwritten texture pattern as a binary bit map. Reference numeral 1104 represents a DL group for drawing an intended image to which a texture pattern is added.

In FIG. 10A immediately after closing the DL, DL's are stored from the head (lower side of the view) of the DL storage buffer 210 in the order of a background drawing DL 1102, a DL 1103 for an underwritten texture pattern, and an image drawing DL 1104. Moreover, reference numeral 1106 of FIGS. 10A and 10B represents the head of the closed DL, and reference numeral 1107 of FIGS. 10A and 10B represents the end of the closed DL.

In the DL separation processing in S1003, in order to perform the rendering processing only on the image drawing DL 1104, only the image drawing DL 1104 is extracted from the once closed DL to reconfigure the DL. Using an area where the image drawing DL 1104 is stored and a free space on the DL storage buffer 210, a DL comprising an underwritten texture pattern fallback background drawing DL 1105 and an image drawing DL 1104 is reconfigured. Note that the underwritten texture pattern fallback background drawing DL 1105 is a DL for drawing a background in which a portion not drawn in the image drawing DL 1104 has the transparency of 100%. In starting the DL separation processing of S1003, it is necessary for the DL storage buffer 210 to have a space with the size capable of storing the underwritten texture pattern fallback background drawing DL 1105. Note that the size of the underwritten texture pattern fallback background drawing DL 1105 is approximately 30 bytes, which is a very small size.

As a result of the DL separation processing of S1003, as shown in FIG. 10B, a DL comprising the underwritten texture pattern fallback background drawing DL 1105 and the image drawing DL 1104, which are sequentially arranged on the memory, is reconstructed and notified to the job control processing section 201.

Because the RIP 113 rasterizes while sequentially analyzing the DL from the head 1105 of the DL, the DL needs to be arranged in the drawing order on the memory. With this DL separation processing, the DL excluding the underwritten texture pattern DL 1103 is reconfigured, so that the fallback processing only on a portion excluding the underwritten texture pattern is possible. That is, the image drawing DL 1104 and the underwritten texture pattern fallback background drawing DL 1105 are reconfigured, and the fallback processing is performed on this reconfigured DL.

As described above, according to the embodiment, when PDL data including an underwritten texture pattern is received, DL is reconfigured by the DL separation processing, thereby removing the underwritten texture pattern from the object to be rendered in the fallback. Thus, even in the case of an underwritten texture pattern, wherein a texture pattern drawing DL object is generated in the middle of generating the DL, the texture pattern can be removed from the target for rendering and compression in the fallback. As a result, lossy compression by the fallback will not be performed on the underwritten texture pattern, and therefore an underwritten texture pattern free from a degradation in the final output image is drawn.

Moreover, for the PDL data including a special pattern, such as an overwritten texture pattern, an electronic watermark, or Anoto data, as with Embodiment 1, the fallback prior to the DL generation processing of the special pattern is generated as required, and therefore a degradation in the image of the special pattern will not occur. Furthermore, in the PDL data including an overwritten texture pattern, an electronic watermark, and Anoto data, there is no need to implement the DL separation processing, and therefore a higher-speed processing is possible.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-087221, filed Apr. 11, 2011, which is hereby incorporated by reference herein in its entirety.

What is claimed is:
1. An image processing device, comprising:
a receiving unit configured to receive document information and additional information;

an intermediate data generation unit configured to generate intermediate data of the document information for generating a raster image from the received document information;

a first buffer configured to store the generated intermediate data of the document information;

a second buffer; and a raster image generation unit configured to generate a raster image from the intermediate data of the document information in the first buffer, store the raster image from the intermediate data of the document information into the second buffer, and delete the intermediate data of the document information from the first buffer, in a case where the received additional information includes a command to draw a special pattern.

2. The image processing device according to claim 1, wherein the intermediate data generation unit is configured to start to generate intermediate data of the additional information after the raster image generation unit starts to delete the intermediate data of the document information from the first buffer, and wherein the first buffer is configured to store the generated intermediate data of the additional information.

3. The image processing device according to claim 2, further comprising:

an estimation unit configured to estimate, in the case where the received additional information includes the command to draw the special pattern, a capacity of the intermediate data of the additional information; and a comparison unit configured to compare the estimated capacity of the intermediate data of the additional information with a capacity of the first buffer remaining in a case where all pieces of the intermediate data of the received document information are stored into the first buffer, wherein the raster image generation unit, in a case where the remaining capacity of the first buffer is determined to be smaller as a result of the comparison, is configured to generate the raster image and delete the intermediate data.

4. The image processing device according to claim 3, wherein the estimation unit is configured to estimate the capacity of the intermediate data of the additional information using size information included in the additional information.

5. The image processing device according to claim 3, wherein the estimation unit, in a case where the special pattern is an Anoto pattern, is configured to estimate the capacity of the intermediate data of the the additional information using a capacity of a download character and an output paper size.

6. The image processing device according to claim 1, wherein the first buffer and the second buffer are in a memory.

7. The image processing device according to claim 1, further comprising:

a compression unit configured to compress the raster image before storing the raster image into the second buffer.

8. The image processing device according to claim 7, wherein the stored raster image in the second buffer is a compressed raster image obtained by the compression.

9. The image processing device according to claim 1, further comprising:

a determination unit configured to determine whether the received additional information includes a command for drawing a specific pattern by referring to the received additional information, wherein the raster image generation unit is configured to generate the raster image from the intermediate data of the document information in the first buffer in response to a determination that the received additional information includes the command for drawing the specific pattern.

10. The image processing device according to claim 1, wherein the intermediate data is a display list which is used by the raster image generation unit to generate the raster image.

11. An image processing method, comprising:

a receiving step of receiving document information and additional information;

an intermediate data generation step of generating intermediate data of the document information for generating a raster image from the received document information;

a step of storing the generated intermediate data into a first buffer of the document information; and a raster image generation step of generating a raster image from the intermediate data of the document information in the first buffer, storing the raster image from the intermediate data of the document information into a second buffer, and deleting the intermediate data of the document information from the first buffer, in a case where the received additional information includes a command to draw a special pattern.

12. A non-transitory computer-readable recording medium storing a program that when executed causes a computer to perform a method comprising:

a receiving step of receiving document information and additional information;

an intermediate data generation step of generating intermediate data of the document information for generating a raster image from the received document information;

a step of storing the generated intermediate data into a first buffer of the document information; and a raster image generation step of generating a raster image from the intermediate data of the document information in the first buffer, storing the raster image from the intermediate data of the document information into a second buffer, and deleting the intermediate data of the document information from the first buffer, in a case where the received additional information includes a command to draw a special pattern.

* * * * *

UNITED STATES PATENT AND TRADEMARK OFFICE
CERTIFICATE OF CORRECTION

PATENT NO. : 8,804,185 B2  
APPLICATION NO. : 13/440279  
DATED : August 12, 2014  
INVENTOR(S) : Naohiro Isshiki Page 1 of 1

It is certified that error appears in the above-identified patent and that said Letters Patent is hereby corrected as shown below:

Title Page, item (73) ASSIGNEE

"Canon Kabuhsiki Kaisha" should read --Canon Kabushiki Kaisha--.

Signed and Sealed this  
Third Day of February, 2015

Michelle K. Lee  
*Deputy Director of the United States Patent and Trademark Office*